Dec. 7, 1954  A. G. HORVATH  2,696,160
ELECTRIC TOASTER
Filed Dec. 31, 1946  4 Sheets-Sheet 1

INVENTOR.
Anthony G. Horvath
BY
Harry S. [Dumar]
ATTORNEY.

Dec. 7, 1954  A. G. HORVATH  2,696,160
ELECTRIC TOASTER
Filed Dec. 31, 1946  4 Sheets-Sheet 2

INVENTOR.
Anthony G. Horvath
BY
Harry S. Demarse
ATTORNEY.

Dec. 7, 1954

A. G. HORVATH 2,696,160

ELECTRIC TOASTER

Filed Dec. 31, 1946

INVENTOR.
Anthony G. Horvath
BY
Harry S. Demarest
ATTORNEY.

Dec. 7, 1954

A. G. HORVATH 2,696,160

ELECTRIC TOASTER

Filed Dec. 31, 1946

INVENTOR.
Anthony G. Horvath
BY
Harry S. Dumarst
ATTORNEY.

United States Patent Office 2,696,160
Patented Dec. 7, 1954

2,696,160

ELECTRIC TOASTER

Anthony G. Horvath, Dayton, Ohio, assignor to The Hoover Company, North Canton, Ohio, a corporation of Ohio Application December 31, 1946, Serial No. 719,351

16 Claims. (Cl. 99—329)

The present invention relates to electric bread toasters and more particularly to a thermal timing mechanism for timing the duration of the timing interval whereby the operator may obtain bread cooked exactly as he or she desires.

In the past it has been usual practice to time the toasting interval by a clockwork mechanism. Clock timers have the defect that the toasting time is fixed and accordingly the bread is progressively toasted more and more for each succeeding toasting operation because the toaster itself is hotter for each succeeding operation, especially when the succeeding operations follow each other in rapid succession.

An attempt has been made to overcome this difficulty by providing a compensating thermostat to speed up the operation of the clockwork mechanism for each succeeding toasting operation. Such timers, however, have been unsatisfactory because of their complexity and of their unreliableness in operation.

As a result thermal timers have been developed. Thermal timers inherently are self-compensating in that the timer as a whole also becomes progressively hotter for each succeeding toasting operation and accordingly shortens the toasting period for each succeeding operation.

It has been found, however, that thermal timers have a tendency to over-compensate. That is, for each succeeding toasting operation, the toast is cooked progressively less and less for any particular timer setting.

This result comes about by reason of the fact that heat is stored in the parts of the thermal timer from the preceding toasting operation and as a consequence the timer becomes hotter and hotter at the start of each succeeding toasting operation. This causes the thermally responsive element of the timr to act faster and faster for each succeeding toasting operation.

According to the broadest aspect of this invention, the thermal mass of the thermally responsive element itself is made so small relative to the thermal mass of the toaster as a whole that the progressive heating up of the entire toaster for each succeeding toasting operation will have little effect on the timing operation of the thermal element as such.

According to another object of the present invention, the difficulty of prior art thermal timers is remedied by making the thermal timer of such small mass that it will cool within a few seconds after it has been heated to discontinue the toasting operation and providing a thermal mass which is moved into contact with the thermal timer at the beginning of each toasting operation to delay the heating up of the timer and thus govern its operation.

According to the present invention, the thermal mass is in the form of a metal plate which is moved into contact with the thermal element automatically by movement of the bread carriers to toasting position. The thermal mass of the metal plate and its position relative to the heating elements is so chosen that when the toaster is operated in quick succession and the entire toaster becomes progressively warmer, the metal plate also becomes progressively warmer but will still always be at a sufficiently low temperature to delay the operation of the thermal element and prevent over-compensation of the timer.

The prior art teaches the preliminary cooling of the thermal timer before the next succeeding toasting operation can be initiated in an attempt to cure the defect of over-compensation.

However, in the prior art devices, it has been necessary for the operator to wait until the thermal timer has cooled before the next succeeding toasting operation can be initiated.

According to the present invention the operator can immediately insert new slices to be toasted after a prior toasting operation without waiting for the thermal timer to cool. The succeeding toasting operation will then proceed automatically without any further attention from the operator.

This invention is to be distinguished from the prior art in that a thermal mass is moved into contact with the thermal timer at the same time that the timer is energized. The primary purpose of the thermal mass is to delay the action of the timer and thus control its operation for each toasting interval.

According to another aspect of the invention a plurality of thermal plates are mounted on an indexing mechanism so related to the toast carriers that the thermal plate which has just been operative is moved out of operative position and a freshly conditioned plate is moved into operative position each time the toast carriage is lowered to its operative position.

Also according to this invention the entire indexing mechanism and the thermal plates are so related to the toast carriage and the thermal timer that the metal plate which has just been moved into operative position is moved into contact with the timer upon movement of the toast carriage to its lower operative position.

According to this invention the thermal plate which is just operated is moved to a position remote from the heating element of the toaster so as to be uneffected by heat therefrom.

Further, according to this invention, each thermal plate, after operation, is moved progressively each time the toast carriage is moved to its lowered position into cooler and cooler positions so that when it is just about to be moved to its operative position it will be in a position to be cooled the maximum amount possible. This will assure that the thermal plate will always be properly conditioned to control the operation of the thermal element as it is moved to its operative position.

Another object of this invention is to provide a manually adjustable shield movable to a position between the heat source and the timer to regulate the amount of heat supplied to the thermal timer and thus provide time settings for any degree of toasting desired.

Other objects and advantages of this invention will become apparent as the description proceeds when taken in connection with the accompanying drawings, in which.

Figure 1:
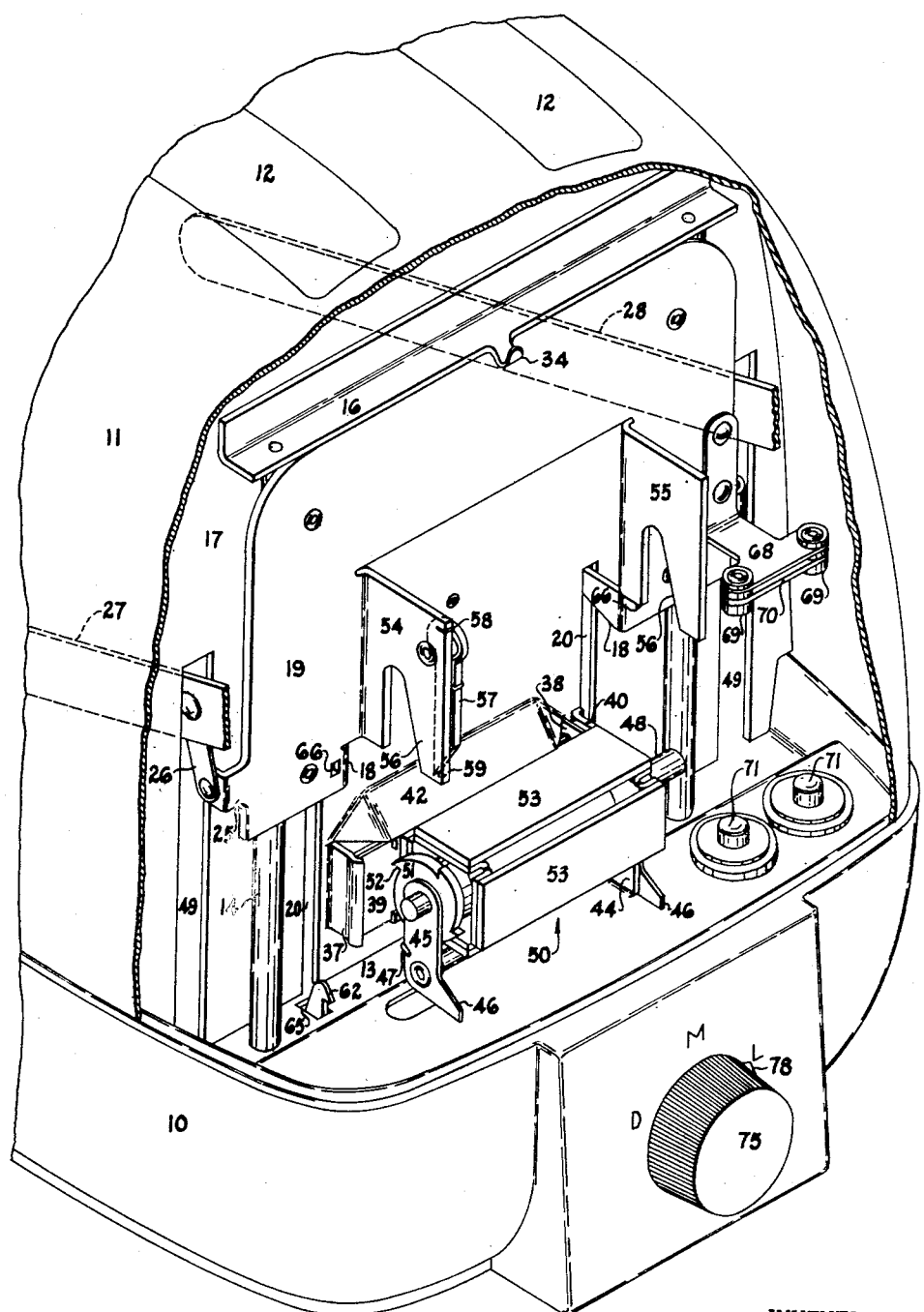
Figure 1 is a perspective view of a toaster with a timing mechanism of this invention applied thereto with the parts broken away to better show the details of the timing mechanism.

Referring to the drawing, the toaster is provided with a plastic base 10 with a cover or appearance housing 11 mounted thereon to cover the mechanism and toasting compartments. The appearance housing 11 is provided with two toast receiving openings 12 as clearly shown in Figures 1 and 2.

A plate 13 (Fig. 2) is mounted on the base 10 and forms the support for the entire mechanism within the appearance housing 11.

Rigidly secured to a depressed portion of the plate 13 are a pair of vertically extending parallel posts 14 which form guides for the toast carriers 15 (Fig. 4) lying immediately below the toast receiving openings 12.

At their upper ends the posts 14 are secured to a bracket 16, rigidly secured to and extending from a plate 17 which forms a division plate between the toast chambers and the mechanism compartment.

The bread carriers 15 are secured to flanges 18 which are struck backwardly from plate 19, which forms the main guiding plate of the bread carriage proper. The flanges 18 extend through openings 20 in the dividing plate 17.

The guide plate 19 of the main carriage carries four rollers 21, 22, 23 and 24 which cooperate with the posts 14 to guide the bread carriers 15 from their upper toast receiving position where the bread projects slightly through the openings 12 to their lower toasting position where the bread slices lie between spaced heaters 72 as is well known in the art.

Figure 4:
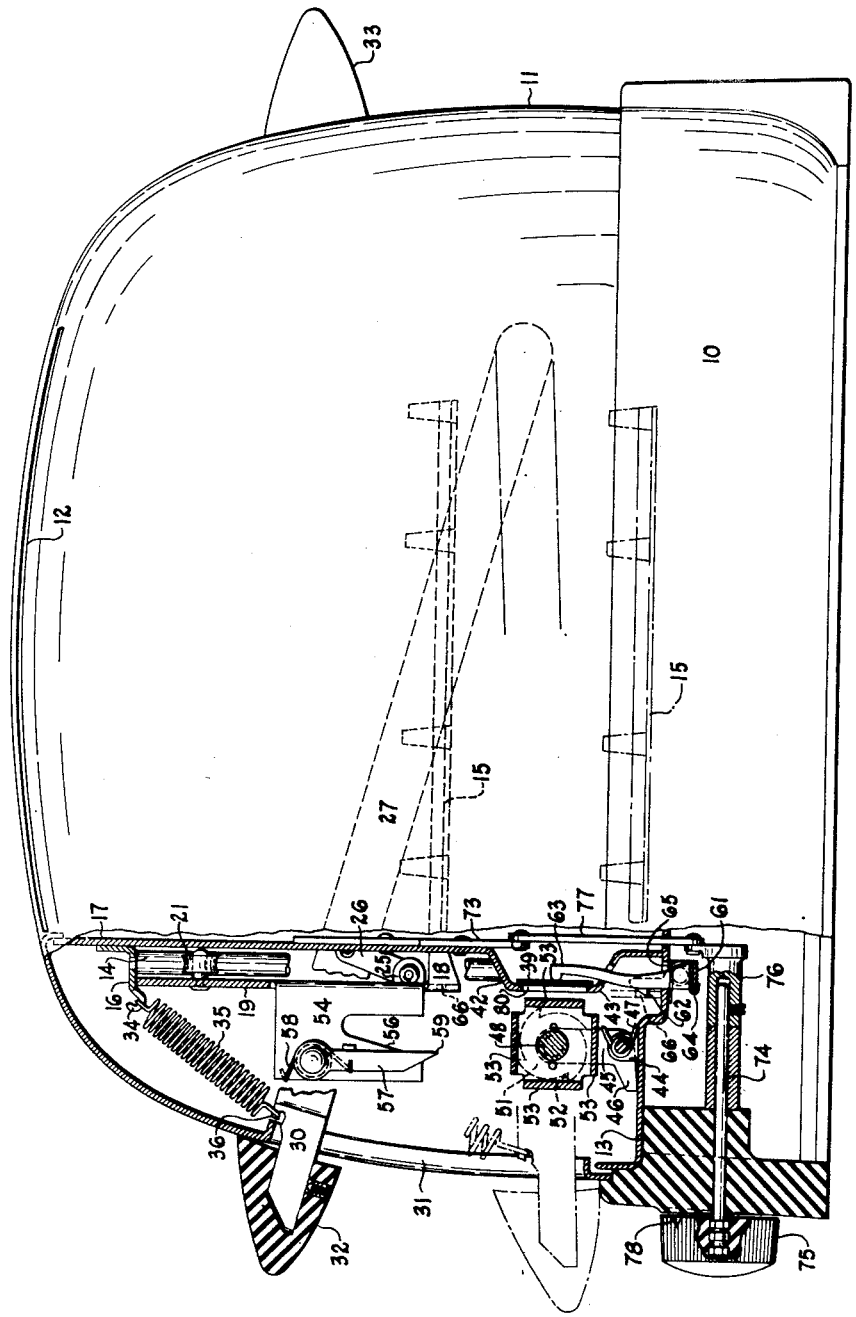
Figure 4 is a side plan view of a toaster showing a cross-sectional view of the timing mechanism of this invention.

Projecting rearwardly from the guide plate 19 are a pair of flanges 25 (one of which is shown at the left of Fig. 1). Pivoted to the flanges 25 are links 26, which are in turn pivoted to the arms 27 and 28 of the manual lever 30 (Fig. 4) which project through an opening 31 in the appearance housing 11. At their rear ends the arms 27 and 28 are pivoted to the side walls of the toast chamber as shown in Figures 1 and 4. The links 26 permit the guide plate 19 to move in a straight vertical direction while the operating arms 27 and 28 move in the arc of a circle.

A manipulating knob 32 is secured to the projecting portion of the lever 30. A second knob 33 is secured to the appearance housing 11 at the opposite end from the knob 32. The knobs 32 and 33 serve as carrying handles for moving the toaster from place to place.

At its central portion, the bracket 16 carries the hook 34 to receive one end of a tension spring 35 (Fig. 4), the opposite end of which is received in a hook 36 on the lever 30.

The arms 27 and 28 are adapted to move upwardly and downwardly in slots 49 in the dividing plate 17.

The lug 37 (Figs. 1 and 5) is struck from the dividing plate 17 and extends into the mechanism compartment. Spaced from the lug 37 is a U-shaped leaf spring 38 (Fig. 5) welded or otherwise secured to the dividing plate 17. A bimetallic thermal element 39 has its ends received in recesses in the lug 37 and one arm of the spring 38. A lug 40 is welded to the plate 17 and extends into the mechanism compartment in parallel relationship to the other leg of the spring 38. A screw 41 is threaded through the lug 40 and serves as a factory adjustment for varying the compressive stress applied lengthwise of the bimetallic strip 39.

The metal of the dividing plate 17 is struck forwardly as shown at 42 and 43 so as to provide an opening 80. The bimetallic strip 39 is positioned immediately to the rear of opening 80 so that the bimetallic strip will receive heat radiated from the heaters 72 positioned in the toast chambers.

Figure 5:
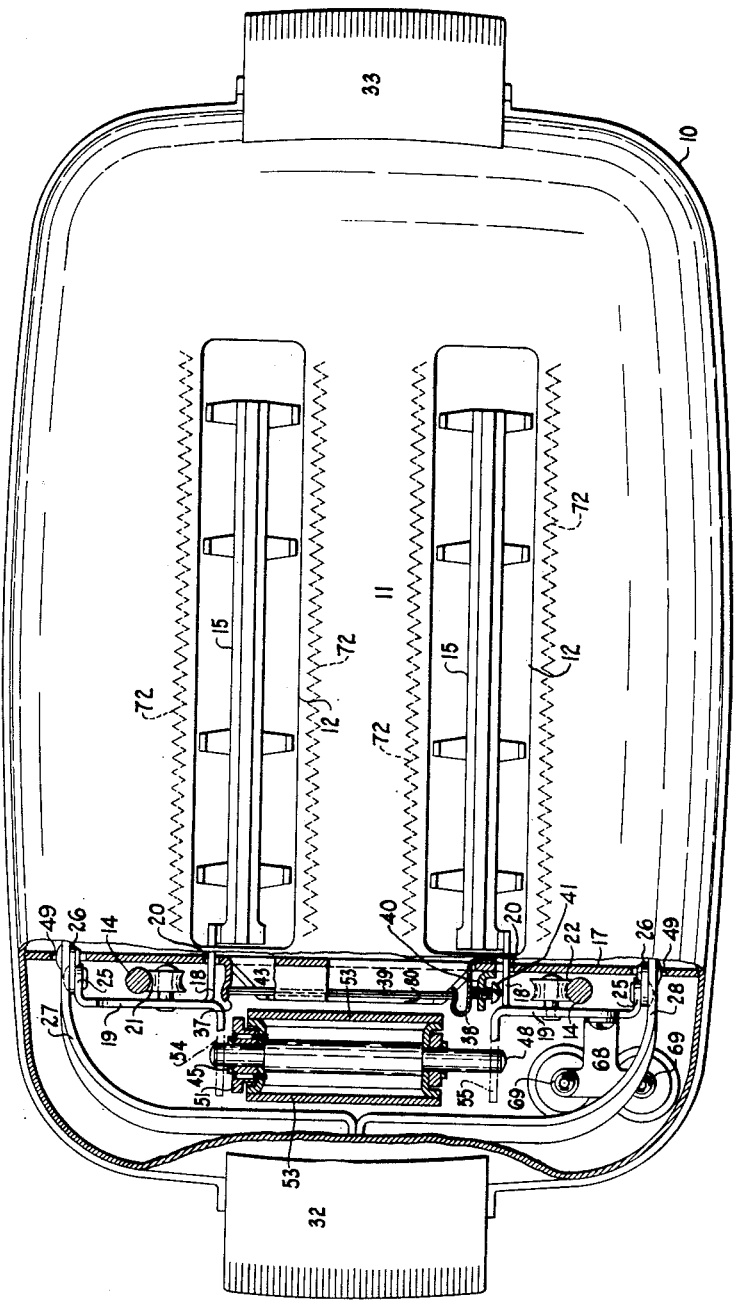
Figure 5 is a top plan view of the toaster with parts broken away to show the timing mechanism according to this invention.

As shown in Fig. 4 the edges of the bimetallic strip 39 rest against the rear edges of the portions 42 and 43 of partition 17 so that the major portion of the strip covers the opening 80. As shown in Fig. 5 the strip 39 is substantially straight but as a matter of fact it is bowed forwardly slightly beyond its dead center position relative to the fulcrum points of the supports 37, 38 so that it will return to and remain in that position when cold.

Pivotally mounted on lugs 44, struck upwardly from the bottom plate 13, are a pair of arms 45 having tail portions 46 normally held in contact with the upper side of the base plate 13 by biasing springs 47.

At their upper ends the arms 45 carry the shaft 48. Rotatable on the shaft 48 is an indexing mechanism generally indicated by the reference numeral 50. The indexing mechanism includes an indexing pawl 51 having four projections 52 for a purpose to be later described and four thermal plates 53 equally spaced about the periphery of the shaft.

A pair of arms 54 and 55 are struck forwardly from the guide plate 19 so as to extend into the mechanism compartment immediately above the ends of the shaft 48. The lower edges of the arms 54 and 55 are recessed to form a pair of cam surfaces 56 which engage the ends of the shaft 48 and move the index mechanism 50 inwardly against the bias of springs 47 when the toast carriage is moved downwardly to its toasting position.

Pivotally mounted on the arm 54 is a pawl engaging lever 57 which is normally held against a stop in the position shown in Figure 1 by a biasing spring 58.

The pointed end 59 of the lever 57 cooperates with the projections 52 on the pawl disc 51 to rotate the indexing mechanism 50 through 90 degrees each time the toast carriage is moved downwardly to its toasting position.

Struck downwardly from the supporting plate 13 (Figs. 2 and 4) are a pair of lugs 60 upon which is pivotally mounted a latch mechanism generally indicated by the reference numeral 61.

The latch mechanism 61 includes two upwardly extending hook portions 62, an upwardly extending actuating lever 63 and a biasing spring 64 which normally holds the latch mechanism in its latching position.

The hooks 62 extend upwardly through openings 65 in the supporting plate 13 and cooperate with openings 66 in the lower edge of guide plate 19 to hold the toast carriage downwardly in its toasting position against the bias of the spring 35.

The actuating lever 63 normally extends upwardly through the support plate 13 and struck out portion 43 to be engaged by the rear of bimetal strip 39 (Fig. 4).

Mounted on a bracket 68, extending forwardly from the guide plate 19, are a pair of movable contacts 69 connected by conducting plate 70 which cooperate with fixed conduits 71 mounted on the base plate 13 so that when the toast carriage is moved to its toasting position the heaters 72 will be energized.

Figure 3:
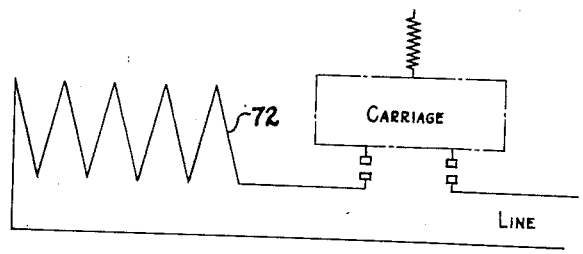
Figure 3 shows a circuit diagram of the toaster according to this invention.

Slidably mounted on the back of the dividing plate 17, on the toast chamber side (Figs. 3 and 4) is a plate 73 which is adapted to be moved upwardly and downwardly between the bimetal 39 and the toast chambers so that the amount of heat radiated from the heaters 72 to the bimetal 39 may be regulated.

Figure 2:
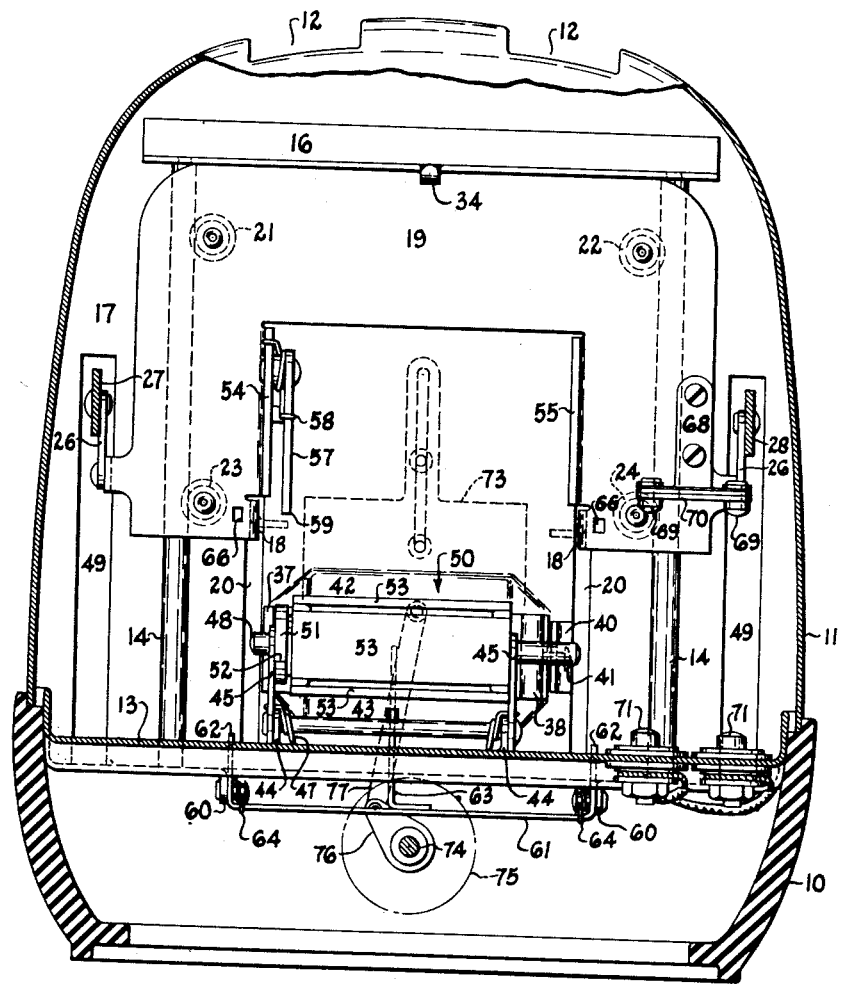
Figure 2 is a cross-sectional view of the toaster showing a front plan view of the timing mechanism of this invention.

In order to manually adjust the plate 73, a shaft 74 is rotatably mounted in the base 10. At one end the shaft 74 carries the manipulating knob 75 and at the other end a crank arm 76, both rigidly connected to the shaft 74. Pivoted to the outer end of the crank arm 76 is a link 77 also pivoted to the lower edge of the plate 73 as shown in Figures 2 and 4.

The knob 75 has a pointer 78 which cooperates with the indicia D, M and L on the front of the base 10 to indicate whether the timer is set for dark, medium or light toast respectively.

The bimetallic strip 39 is so made that in its cold position it will rest against the edges of the opening 80 in the dividing plate 17 as previously described. When the toaster is energized, heat radiated from the heaters 72 will cause the bimetal strip 39 to warp inwardly towards the toast chambers.

When the pointer 78 on the knob 75 is set in a position shown in Figure 1 at the indicia L, the plate 73 will be in its uppermost position and the greatest amount of heat possible will be radiated to the bimetal 39. If the knob 75 is rotated to the left from the position shown in Figure 1 so that the pointer 78 will be at the indicia M, the plate 73 will be moved downwardly from the position shown in Figure 4 so as to partially shield the bimetal strip 39 from heat radiated from the toast chambers. This will result in less heat being radiated to the bimetal strip 39 so that the toasting period will be longer and consequently the bread toasted to a greater extent.

If now the knob 75 is moved further towards the left so that the pointer 78 is adjacent to the indicia D, the plate 73 will be moved downwardly still farther from the position shown in Figure 4 and shield the bimetal 39 from heat being radiated from the toast chamber to a still greater extent so that the toasting period will be still longer, and accordingly, the toast will be toasted to a dark brown. The pointer 78 may be moved to any position between the indicias L and D so that toast of any desired coloring may be obtained.

*Operation*

With the handle 30 and correspondingly the bread carriers 15 in their upper toast receiving position, the operator adjusts for light, medium or dark toast as desired by rotating the adjusting knob 75 to the proper position and inserts bread slices through the openings 12 so that the slices rest on the carriers 15 and project slightly above the appearance housing 11.

The operator then moves the handle 30 to its downward position as shown in dotted lines of Figure 4 against the tension of the spring 35. At this time the bimetallic strip 39 will be cold so as to lie against the edges of the opening 80 in the dividing plate 17 as shown in Figure 4.

Downward movement of the handle 30 will cause downward movement of the guide plate 19 so that the end 59 of the pawl lever 57 will engage the projection 52 upon the pawl disc 51 which is in uppermost position and rotate the indexing mechanism 50 counterclockwise as viewed in Figure 4. This will cause the thermal plate 53 which is immediately in front of the bimetallic strip 39 to be moved 90 degrees to uppermost position and at the same time will move the thermal strip 53 which is shown in downward position of Figure 4, into a position immediately in front of a bimetallic strip 39.

At the same time the cams 56 on the arms 54 and 55 will contact the ends of the shaft 48 and move the entire indexing mechanism 50 inwardly against the bias of the springs 47 so that the thermal plate 53, then immediately in front of the bimetallic strip 39, will contact or come into heat exchange relation with the bimetallic strip 39. Preferably, the parts are so related that the plates 53 press the bimetal 39 slightly away from the edges of the opening 80 in the dividing plate 17 against the tension of the adjusting spring 38 but not sufficiently to move it to its dead center position.

Movement of the guide plate 19 to its lowered position also causes the hooked ends 62 of the latch mechanism 61 to snap into the openings 66 in the guide plate 19 so as to hold the entire toast carriage in downward toasting position against the bias of the spring 35. At the same time, the movable contacts 69 will contact the fixed contacts 71 so as to energize the heaters 72 and the toasting operation begins.

Energization of the heaters 72 will cause heat to be radiated therefrom to the bimetallic strip 39 and, of course, to the bread being toasted. Since at this time a comparatively cool metal thermal strip 53 is in contact with or in heat exchange relation to the bimetallic strip 39, heat will be transmitted from the bimetallic strip 39 to the thermal plate 53 so that the bimetallic strip 39 will remain substantially in a stationary position until both it and the thermal contact plate 53 have been heated to such an extent that the bimetallic strip will flex away from thermal plate 53. After the bimetallic strip 39 has flexed away from the thermal strip 53, it will heat up quite rapidly due to the fact that its thermal mass is small. Accordingly, it will almost immediately snap past its dead center position to a position in which it is bowed inwardly toward the toast chamber. In moving to its inward bowed position, the bimetallic strip 39 will move the operating lever 63 of the latch mechanism 61 clockwise as viewed in Figure 4 so as to move the hook portions 62 of the latch 61 out of the openings 66 in the lower edge of the guide plate 19 so that the entire toast carriage will be moved to upward toast receiving and ejecting position by the action of the spring 35.

A manual lever having a portion extending through the housing 11 or base 10 for manual manipulation may be provided for releasing the latch mechanism 61 manually independently of the timer if it should be desired to release the toast carriers before the timing interval is completed.

As can be seen, the toasting period for any given setting of the knob 75 is governed almost entirely by the mass of the thermal plates 53 and their heat conducting and heat radiating characteristics. By proportioning the thermal properties such as mass, conductivity and radiating characteristics of the plates 53 with the heating rate of the heaters 72, the mass and heat radiation characters of the toaster as a whole, the toasting interval can be nicely regulated for any particular toaster. If desired, heat rejecting fins or some such other arrangement may be used for changing the thermal characteristics of the plates 53. Also by regulating the shutter or shield 73, any degree of toasting can be obtained. The factory adjusting screw 41 may be used to regulate the timer to a nicety.

This makes it possible to make the mass of the bimetal 39 itself so small and its heat radiating properties such that it will cool almost instantly once the toaster heaters are deenergized.

If the bimetal itself should be made of such mass that it will properly time the cooking period, it will take it a considerable time to cool after the heat source is deenergized.

According to the present invention the bimetal strip 39 will snap back to the position shown in Figure 4 almost immediately after it has operated to release the toast carriage and deenergize the heaters 72. Preferably, the entire surface of the bimetal 39 is blackened by a suitable oxide coating so that it will emit heat more rapidly and thus cool more quickly.

After the first slice has been toasted the operator can immediately insert new slices of bread through the openings 12 and again move the entire toast carriage downward to toasting position. The mechanism will operate as previously described, except that at this time the thermal plate 53, which has just been heated by contact with the bimetallic strip 39, will be moved away from the bimetallic strip 39 by the indexing mechanism previously described and the thermal plate 53 which is cooled the most will be moved into position to contact the bimetal 39 and govern the succeeding toasting period.

It will be noted that at least three toasting operations must be made before a thermal plate 53, which has previously been used, can come into position for governing a succeeding toasting operation. Furthermore, it is to be noted that it is the thermal plate 53 which is near the bottom plate 13, in a position to be less affected by the heat of the toaster, which is thereafter brought into a position to control the next toasting interval.

This will always assure that the thermal plates are properly conditioned for the proper timing action.

It will also be evident that the thermal timer of this invention is self-compensating and does away with the tendency to over-compensate present in prior thermal timers.

If the toaster is operated in quick succession, the entire toaster will store up more and more heat. As a consequence, the thermal plates 53 will become warmer and warmer. Thus, for each succeeding toasting operation, less and less heat will be transmitted to the thermal plates 53 before the bimetal 39 will move out of contact therewith. This will cause the toasting period to become shorter and shorter. However, since the timing interval is not dependent solely upon the initial temperature of the bimetal 39 which may be quite hot but upon the temperature of a mass of metal which has been moved away from the heat source over a period, the tendency to over-compensate is avoided.

It is within the purview of this invention to provide an auxiliary heater separate and distinct from the main heaters 72 to heat the timer which is constituted by the bimetal 39 and the thermal plates 53 and to govern the radiation of heat from the auxiliary heater to the timer by a movable shield such as the plate 73.

The words "thermal mass" as used herein mean merely that the absorbing means has a capacity to absorb heat and as a consequence it will take some time to supply heat sufficient to raise the timer to a predetermined temperature.

While I have shown and described but a single modification of my invention, it is to be understood that this modification is to be taken as illustrative only and not in a limiting sense. I do not wish to be limited to the particular structures shown and described, but to include all equivalent variations thereof except as limited by the scope of the claims.

I claim:

1. A toaster including bread carriers movable from an upper bread receiving position to a lower toasting position and spring-biased to a bread receiving position, a latch for latching said bread carriers in toasting position, a thermal timer for said toaster including a thermally responsive element and a thermal mass adapted to be moved into contact with said thermally responsive element, said thermally responsive element being movable from a cold position to a hot position when heated, means for moving said toast carriers to toasting position, means actuated by movement of said bread carriers to toasting position for supplying heat to said thermal timer and for moving said thermal mass into heat exchange relationship with said thermally responsive element to add its mass to that of said thermally responsive element to delay the movement of the latter to its hot position and means actuated by movement of said thermally responsive element upon movement to its hot position for releasing said toast carriers and for discontinuing the supply of heat to said thermally responsive element.

2. In a toaster, spaced heating means, bread carriers movable from a bread receiving position to a toasting position between said heating means, a thermal timer comprising a thermally responsive element and a thermal mass movable into heat exchange relationship with said thermally responsive element so as to modify the action of said thermally responsive element, said thermally responsive element being movable from a cold position to a hot position when heated, said timer being so positioned as to be heated by said heating means and means actuated by movement of said bread carriers to toasting position for energizing said heating means and for moving said thermal mass into heat exchange relationship with said thermally responsive element to add its mass to that of said thermally responsive element to delay the movement of the latter to its hot position so as to prevent overcompensation of said thermal timer and means actuated by movement of said thermally responsive element to its hot position to terminate the timing interval.

3. In a toaster, bread carriers movable to a toasting position, a thermal timer including a thermally responsive element and a plurality of thermal bodies movable successively into heat exchange relationship with said thermally responsive element, heating means for said timer and means actuated by movement of said bread carriers to toasting position for energizing said heating means, for moving one of said bodies away from and a second of said bodies into a position adjacent to said thermally responsive element and for moving said second body into heat exchange relationship with said thermally responsive element.

4. In a toaster, bread carriers movable into toasting position, a thermally responsive element, a rotatable indexing mechanism positioned in front of said thermally responsive element, a plurality of thermal bodies equally spaced about the periphery of said indexing mechanism, said indexing mechanism being mounted for movement toward said thermally responsive element and being spring-biased away from said thermally responsive element, means for heating said thermally responsive element and means actuated by movement of said carriers to toasting position for energizing said heating means, for rotating said indexing mechanism so as to move one of said bodies away from and a second of said bodies into a position in front of said thermally responsive element and for moving said indexing mechanism toward said thermally responsive element to bring said second body into heat exchange relationship with said thermally responsive element.

5. In a toaster, bread carriers movable into toasting position, a thermally responsive element, a rotatable indexing mechanism positioned in front of said thermally responsive element, a plurality of thermal bodies equally spaced about the periphery of said indexing mechanism, said indexing mechanism being mounted for movement toward said thermally responsive element and being spring-biased away from said thermally responsive element, means for heating said thermally responsive element, an indexing lever carried by said carriers for rotating said indexing mechanism upon movement of said carriers to toasting position so as to move one of said bodies away from in front of said thermally responsive element into a position to be cooled and a second of said bodies into a position in front of said thermally responsive element, cam means carried by said carriers for moving said indexing mechanism toward said thermally responsive element so as to bring the second of said bodies into heat exchange relationship with said thermally responsive element when said carriers are moved to toasting position and means actuated by movement of said bread carriers to toasting position for energizing said heating means.

6. In a toaster, a toasting chamber, a mechanism compartment, a partition separating said toasting chamber from said mechanism compartment, heaters in said toasting chamber, a thermally responsive element positioned in said toasting chamber in a recess formed in said partition so as to receive heat radiated from said heaters, bread carriers in said toasting chamber mounted for movement to and from toasting position, a guide plate in said mechanism compartment for guiding said bread carriers in their movement, a thermal body in said mechanism compartment in front of said thermally responsive element mounted for movement toward and away from said thermally responsive element, an opening in said partition between said thermally responsive element and said thermal body, means carried by said guide plate for moving said thermal body into heat exchange relationship with said thermally responsive element upon movement of said carriers to toasting position and means carried by said guide plate for energizing said heaters upon movement of said bread carriers to toasting position.

7. In a toaster, a toasting chamber, a mechanism compartment, a partition separating said toasting chamber from said mechanism compartment, heaters in said toasting chamber, a thermally responsive element positioned in said mechanism compartment in front of an opening in said partition so as to receive heat radiated from said heaters, bread carriers in said toasting chamber mounted for movement to and from toasting position, a guide plate in said mechanism compartment for guiding said bread carriers in their movement, a plurality of thermal bodies in said mechanism compartment in front of said thermally responsive element, said bodies being mounted for both rotary movement so that said bodies can be brought successively into a position in front of said thermally responsive element and into a position remote therefrom and for translatory movement toward and away from said thermally responsive element, means carried by said guide plate for rotating said bodies to bring one of said bodies in front of said thermally responsive element when said carriers are moved to toasting position, additional means carried by said guide plate for moving said one body into heat exchange relationship with said thermally responsive element when said carriers are moved to toasting position and means actuated by movement of said carriers to toasting position for energizing said heaters.

8. A toaster including bread carriers movable from an upper bread receiving position to a lower toasting position and spring-biased to bread receiving position, means for moving said bread carriers to toasting position, a latch for holding said bread carriers in toasting position, heating means for said toaster, a thermally responsive element for controlling the duration of the toasting operation and being movable from a cold position to a hot position upon being heated to terminate toasting intervals, a cooling block mounted adjacent to said thermal responsive element, said cooling block being so mounted as to be movable into contact with said thermally responsive element upon initiation of a toasting interval to add its mass to that of said thermally responsive element and thus delay movement of the latter to its hot position and means operable by movement of said bread carriers to toasting position for moving said cooling block into contact with said thermally responsive element and for simultaneously energizing said heater.

9. A thermal timer comprising, a thermally responsive element movable from a cold position to a hot position in performing a timing function, a thermal mass movable into heat exchange relationship with said thermally responsive element to add its mass to that of said thermally responsive element and thus delay movement of the latter to its hot position, means for simultaneously supplying heat to said thermally responsive element and moving said thermal mass into heat exchange relationship with said thermally responsive element, said thermally responsive element being so constructed and arranged as to move away from said thermal mass upon reaching a predetermined temperature and means actuated by the movement of said thermally responsive element upon movement thereof to its hot position for terminating the supply of heat to said thermally responsive element.

10. A thermal timer comprising, a thermally responsive element having low heat storage capacity and high heat dissipating properties movable from a cold position to a hot position in performing a timing function, a thermal body having high heat storage capacity, a heater positioned to radiate heat directly to said thermally responsive element and means for simultaneously energizing said heater and bringing said thermal body into heat exchange relationship with said thermally responsive element to add its mass to that of said thermally responsive element to delay the movement of said thermally responsive element responsive to the heat supplied thereto.

11. A thermal timer comprising, a thermally responsive element having low heat storage capacity and high heat dissipating properties, a thermal body having high heat storage capacity, a heater positioned to radiate heat directly to said thermally responsive element, means movable to a position between said heater and thermally responsive element to regulate the amount of heat radiated to said thermally responsive element and means for simultaneously energizing said heater and bringing said thermal body into heat exchange relationship with said thermally responsive element to delay movement of said thermally responsive element.

12. A self-compensating thermal timer comprising, a thermal mass having a high heat absorbing capacity and a bimetallic strip having a low heat storage capacity and high heat radiating characteristics, supports at opposite ends of said strip, one of said supports including a spring, adjustable means for applying a force to the spring to provide a factory adjustment, said strip and supports being so constructed and arranged that said strip snaps from a first stable bowed position on one side of said supports to a second bowed stable position on the opposite side of said supports as it is heated and back to its first stable position when it is cooled and means for simultaneously supplying heat to said bimetallic strip and moving said thermal mass into heat exchange relationship therewith.

13. In a toaster, bread carriers movable from a bread receiving position to a toasting position, a thermal timer consisting of a thermally responsive element of low heat absorbing capacity and heat absorbing means of higher heat absorbing capacity, heating means positioned for applying heat to bread on said carriers when in toasting position and for applying heat to said thermally responsive element, means for bringing said heat absorbing means and said thermally responsive element into heat exchange relationship with each other to add the thermal mass of the former to that of the latter and thus delay the heating up of the latter, means for moving said carriers to toasting position, means actuated by movement of said carriers to toasting position for energizing said heating means whereby heat is applied to bread positioned on said carriers and to both said thermally responsive element and said heat absorbing means, said thermally responsive element and said heat absorbing means being of such nature and so related that they are removed from heat exchange relationship with each other when they reach a first predetermined temperature whereby heat from said heating means is applied solely to said thermally responsive element to heat it to a second predetermined higher temperature to cause it to move from a first position to a second position and means actuated by such movement and operable to deenergize said heating means.

14. In a toaster, bread carriers movable from a bread receiving position to a toasting position, a thermal timer consisting of a thermally responsive element of low heat absorbing capacity and heat absorbing means of higher absorbing capacity, heating means positioned for applying heat to bread on said carriers when in toasting position and for applying heat to said thermally responsive element, means for moving said carriers to toasting position, means actuated by movement of said carriers to toasting position for moving said heat absorbing means and said thermally responsive element into heat exchange relationship to each other to add the thermal mass of the former to that of the latter and thus delay the heating up of the latter and for energizing said heating means whereby heat is simultaneously applied to bread on said carriers and to both said thermally responsive element and said heat absorbing means, said thermally responsive element and said heat absorbing means being of such nature and so related that when they are heated to a first predetermined temperature they move out of heat exchange relationship with each other whereby heat is applied only to the bread and to said thermally responsive element to heat said thermally responsive element to a second higher temperature to cause it to move from a first position to a second position and means actuated by such movement and operable to deenergize said heating means.

15. A toaster including bread carriers movable from an upper bread receiving position to a lower toasting position and spring-biased to bread receiving position, means for moving said carriers to toasting position, a thermal timer comprising a thermal mass of high heat capacity and a thermally responsive element of relatively small heat capacity normally separated from each other for controlling the duration of a toasting interval, said thermally responsive element being movable from a cold position to a hot position upon being heated, means for supplying heat to said thermal timer upon movement of said carriers to toasting position and for moving said thermal mass into contact with said thermally responsive element to add its mass to that of said element to delay its movement to its hot position and means actuated by movement of said thermally responsive element to its hot position for terminating the toasting interval.

16. In a thermal timer for timing the duration of a timed interval, a thermally responsive element movable from a first position to a second position upon being heated to a predetermined temperature, means for applying heat to said thermally responsive element upon the initiation of a timed interval, means for delaying the action of said thermally responsive element including heat absorbing means having a definite heat absorbing capacity and means for bringing said delaying means into heat exchange relationship with said thermally responsive element at the initiation of said timed interval and simultaneously with the application of heat to the thermally responsive element.

References Cited in the file of this patent

UNITED STATES PATENTS

| Number | Name | Date |
|---|---|---|
| 1,988,230 | Avery | Jan. 15, 1935 |
| 2,038,361 | Hawes | Apr. 21, 1936 |
| 2,099,210 | Ireland | Nov. 16, 1937 |
| 2,162,899 | Sardeson | June 20, 1939 |
| 2,167,121 | McCreary et al. | July 25, 1939 |
| 2,237,146 | Ireland | Apr. 1, 1941 |
| 2,250,979 | Winborne | July 29, 1941 |
| 2,269,162 | Newell | Jan. 6, 1942 |
| 2,301,070 | Myers | Nov. 3, 1942 |
| 2,426,620 | Koci | Sept. 2, 1947 |